US010562529B2

(12) United States Patent
Moulene (10) Patent No.: US 10,562,529 B2
(45) Date of Patent: Feb. 18, 2020

(54) AUTOMATIC TRANSPORT SYSTEM (71) Applicant: Daniel Moulene, Vilennes sur Seine (FR)

(72) Inventor: Daniel Moulene, Vilennes sur Seine (FR)

(*) Notice: Subject to any disclaimer, the term of this patent is extended or adjusted under 35 U.S.C. 154(b) by 22 days.

(21) Appl. No.: 16/072,054

(22) PCT Filed: Jan. 27, 2017

(86) PCT No.: PCT/FR2017/050192
§ 371 (c)(1),
(2) Date: Jul. 23, 2018

(87) PCT Pub. No.: WO2017/129918
PCT Pub. Date: Aug. 3, 2017

(65) Prior Publication Data
US 2019/0039615 A1 Feb. 7, 2019

(30) Foreign Application Priority Data
Jan. 29, 2016 (FR) .................................. 16 00155

(51) Int. Cl.
B60W 30/09 (2012.01)
B60W 30/16 (2012.01)
(Continued)

(52) U.S. Cl.
CPC ........ B60W 30/0956 (2013.01); B60W 30/16 (2013.01); G05D 1/0255 (2013.01);
(Continued)

(58) Field of Classification Search
CPC ..... B60W 30/0956; B60W 30/16; E01C 1/00; G05D 1/0255; G05D 1/0297; G05D 2201/0212
See application file for complete search history.

(56) References Cited

U.S. PATENT DOCUMENTS 3,593,262 A * 7/1971 Spencer ................. G08G 1/075
340/932
5,289,778 A * 3/1994 Romine .................. B60F 1/043
104/124

(Continued)

FOREIGN PATENT DOCUMENTS

WO 2009/106920 A2 9/2009
WO 2013/003387 A2 1/2013

OTHER PUBLICATIONS

International Search Report for corresponding PCT application No. PCT/FR2017/050192, dated May 11, 2017.

Primary Examiner — Tyler J Lee
(74) Attorney, Agent, or Firm — Notaro, Michalos & Zaccaria P.C.

(57) ABSTRACT

The invention relates to an automatic transport system based on a network of one-way high-speed-traffic lanes (25, 26, 27, 28) without crossings or red lights, mainly on a pylon (13), dedicated to vehicles capable of operating in an automatic mode in which the driver plays no part in controlling the automotive vehicle. The transport system has stations for the travelers which are different from the entry and exit zones for the vehicles and has high-speed-traffic lanes and service lanes, so that not all of the vehicles are forced to go past the stations and the entry and exit zones.

21 Claims, 4 Drawing Sheets (51) Int. Cl.
*G05D 1/02* (2006.01)
*E01C 1/00* (2006.01)
*B60W 30/095* (2012.01)

(52) U.S. Cl.
CPC .............. *G05D 1/0297* (2013.01); *E01C 1/00* (2013.01); *G05D 2201/0212* (2013.01)

(56) References Cited

U.S. PATENT DOCUMENTS

| | | | |
|---|---|---|---|
| 6,012,396 A | 1/2000 | Schulz | |
| 6,100,821 A * | 8/2000 | Tanji | G08G 1/01 180/168 |
| 7,047,888 B2 * | 5/2006 | Richards | B61B 15/00 104/27 |
| 7,975,620 B2 * | 7/2011 | Pumpelly | B61B 13/04 105/215.2 |
| 8,783,192 B2 * | 7/2014 | Smith | B60L 13/10 104/281 |
| 9,085,305 B2 * | 7/2015 | Pumpelly | B60L 9/00 |
| 9,096,236 B2 * | 8/2015 | Kissel, Jr. | B61C 13/04 |
| 2004/0260455 A1 * | 12/2004 | Dort | G08G 1/096725 701/117 |
| 2005/0165537 A1 * | 7/2005 | Dort | G08G 1/0104 701/117 |

\* cited by examiner

AUTOMATIC TRANSPORT SYSTEM

TECHNICAL FIELD

The invention relates to the technical field of transport.

TECHNICAL BACKGROUND

Numerous studies have, over these past few years, demonstrated the feasibility of driverless vehicles, particularly automotive vehicles.

However, there is currently a stumbling block regarding full-scale introduction of this technology under the normal conditions in which cars move around because it is extremely difficult to make vehicles operate in the real-life environment such as motorways, trunk roads, roads, etc. because of the very varied elements that may constitute the traffic thereon, such as trucks, buses, other cars, motorbikes, scooters, bicycles, pedestrians and animals. Because of this heterogeneity of the traffic components involved, full automation of automobiles, namely driverless vehicles on the open road is not predicted to come to pass before 2030 or even 2035, at level 5 of the OICA (International Organization of Motor Vehicle Manufacturers) scale.

By contrast, it is already possible to achieve driverless driving of a stable, i.e. 3- or 4-(or more)-wheel, motor vehicle under controlled environmental conditions particularly on a non-open road, even at speeds in excess of 120 km/h.

On the other hand, the quality of public transport solutions is often unsatisfactory in terms of frequency, in terms of journey time and in terms of the supply fitting the demand with, for example, empty vehicles at night and, in peak periods, vehicles which are packed and excessive journey times.

In order to address the problem of public transport, there are numerous solutions proposed which employ pods guided on a suspended rail placed on pylons, such as, for example the Skytran patent WO 2013/003387 or the SMT rail project. However, all these solutions do is add another mode of transport that is not compatible with the existing types of passenger transport (motorcars, buses, trams, metro, trains, etc.).

In order to improve passenger transport to suit the demand by using driverless automatic vehicles, the Sitar patent application WO2009/106920 proposes a method for automatically guiding motorized vehicles on a road and an automatic transport system using optical guides on the road, which the vehicles read. However, that document envisions lanes with intersections, and even with stops, and this does not make for fast-moving, free-flowing traffic.

Congestion in traffic lanes dedicated to motorcars is often great and also slows down land-based public transport services such as buses or trams. It is therefore often proposed that entire traffic lanes be reserved for these public transport vehicles. However, even though these often take priorities at crossroads, because they often stop at stations and at crossings, their average speed (commercial speed) is very low, at around about 20 km/h or even less, despite their reserved (so-called exclusive i.e. dedicated) lanes.

In addition, reserving these traffic lanes for a certain category of vehicles increases the congestion in the remaining traffic lanes.

In fact, there is a real need to, on the one hand, make the earliest possible use of automated vehicles without the control of a driver, particularly to reduce the level of accidents and, on the other hand, have collective or public transport means that perform well.

SUMMARY

The invention seeks to solve the aforementioned problems by proposing a transport system that combines both the carriage of individuals in automotive vehicles and the carriage of travelers in public transport shuttles, that meets safety requirements and guarantees optimal speeds of travel.

In order to achieve that, according to one embodiment, the invention proposes a transport system comprising:

vehicles each of which is equipped with tires, with at least one electric motor and with an internal energy reserve which at least partially contribute to the propulsion of said vehicle, with onboard sensors and with steered wheels, said vehicles being, on the one hand, automotive vehicles able to operate in an automatic mode in which the driver plays no part in controlling the automotive vehicle, and, on the other hand, collective passenger transport shuttles able to operate automatically and driverlessly, said vehicles being able to guide themselves using the onboard sensors and the steered wheels;

a plurality of one-way high-speed-traffic lanes comprising at least one traffic lane per direction of traffic, said high-speed-traffic lanes each having no intersections, having no crossings, having no stopping points, and being constructed on the same level or at different levels on pylons and/or in tunnels;

a plurality of service lanes allowing said vehicles access to the high-speed-traffic lanes and connecting said high-speed-traffic lanes to entry zones for the automotive vehicles, to exit zones for the automotive vehicles and to stations for the public transport shuttles;

the high-speed-traffic lanes and said service lanes being bounded on each side by uprights; said high-speed traffic and service lanes having no upright between the lanes at each place dedicated to a lane change, the entry zones for the automotive vehicles comprising entry lanes which are each connected to at least one high-speed-traffic lane by a service lane; each entry lane comprising an access control device configured to:

determine at least one specific characteristic of an entering automotive vehicle, chosen from among an access certificate, homologation information, dimensions, the weight, the range autonomy and the state of health of said entering automotive vehicle;

compare said at least one checked specific characteristic against a guideline;

allow or refuse the automotive vehicle access to the high-speed-traffic lanes, according to said comparison; and force an entering automotive vehicle with access authorization to operate in automatic mode and transmit to said entering automotive vehicle a signal to lock the automatic mode; said automotive vehicles being designed to, in response to receipt of said signal for locking the automatic mode, render the controls for steering, accelerating, braking, gear selection, starting and stopping the automotive vehicle inoperative by the driver;

the exit zones for automotive vehicles being connected to the high-speed-traffic lanes by service lanes and comprising exit lanes, each exit lane comprising an exit device configured to transmit to each leaving automotive vehicle a signal to unlock the automatic mode; said automotive vehicles being designed to, in response to receipt of said signal for unlocking the automatic mode, render the controls for steering, accelerating, braking, gear selection, starting and stopping the automotive vehicle operative by the driver and allow said driver to resume control of the movement of his vehicle;

the stations for the public transport shuttles each comprising a platform allowing travelers to enter or leave one of the public transport shuttles, said stations for the public transport shuttles each being connected to at least one traffic lane by at least two service lanes, these respectively being a departure and an arrival service lane;

a traffic management device configured to deliver to each vehicle traveling on the high-speed-traffic and service lanes of the transport system speed setpoints dependent on the high-speed-traffic or service lane on which said vehicle is traveling and dependent on information indicative of the number, geographical position and speeds of the other vehicles traveling in said lanes.

Such a transport system is particularly advantageous in that, bearing in mind that the vehicles are operated in automatic mode, it is possible to maintain stable inter-vehicle distances, thereby avoiding the phenomena of bottlenecks and consequently making it possible to achieve significant traveler flow.

Furthermore, the fact that people do not have to concern themselves with driving affords an appreciable advantage in terms of comfort and makes it possible to reduce considerably the risk of accidents.

Moreover, such a transport system is particularly efficient from an environmental standpoint given the low impact of the lanes on pylons, the reduction in the footprint at ground level, the absence or low level of atmospheric pollution, the reduction in noise, and the lower energy consumption.

According to other advantageous embodiments, such a transport system may exhibit one or more of the following features.

According to one embodiment, the transport system further comprises an automotive-vehicle movement management device that is configured to:

receive a request comprising identification information associated with an automotive vehicle, departure time information and information indicative of a journey from one of the entry zones to one of the exit zones;

determine a variable indicative of an estimate of the level of traffic on the lanes affected by said request according to said departure time information and said information indicative of a journey;

compare the variable indicative of an estimate of the level of traffic against a threshold value; and deliver to the automotive vehicle associated with the identification information an access certificate when the variable indicative of an estimate of the level of traffic is below said threshold value;

each access control device being configured to determine whether an automotive vehicle is associated with an access certificate and to authorize access by said automotive vehicle when it is associated with an access certificate.

According to one embodiment, the transport system further comprises a traveler movements management device configured to:

receive a request from a traveler comprising time information, information indicative of a journey from a departure public transport shuttle station to an arrival public transport shuttle station;

in response to said request, deliver to the traveler personal information relating to a departure time of a public transport shuttle and personal information relating to a position of said public transport shuttle on the platform of the departure public transport shuttle station.

According to one embodiment, the traveler movements management device is further configured to determine a journey of a public transport shuttle according to a plurality of traveler requests received in such a way as to optimize the filling of said public transport shuttle.

According to one embodiment, the transport system comprises, for each direction of travel, several high-speed-traffic lanes, the traffic management device being configured to assign faster or slower speed setpoints to the vehicles according to whether they are traveling on a first or a second of said high-speed-traffic lanes in one and the same direction of travel.

According to one embodiment, the access control device comprises additional means for dynamic control of the entering vehicle, which means are configured to:

determine at least one characteristic indicative of the dynamic behavior of a vehicle, chosen from the quality of the courses followed, the speed with respect to a setpoint speed, the acceleration and deceleration capabilities of the entering vehicle;

compare said controlled characteristic indicative of the dynamic behavior of the entering vehicle against a guideline; and allow or refuse the automotive vehicle access according to said comparison.

According to one embodiment, the platform of at least one of the stations for the public transport shuttles comprises platform doors, presence detectors able to detect the presence of a public transport shuttle in front of each of the platform doors and means for controlling the platform doors which are able to trigger the opening of one of the platform doors in response to detection of a transport shuttle in front of said platform door.

According to one embodiment, the transport system further comprises means able to deliver a warning signal signaling the presence of at least one passenger in front of one of the platform doors, said means for controlling the platform doors being able to trigger the opening of one of the platform doors in response to the receipt of a warning signal.

According to one embodiment, the means able to deliver a warning signal may notably comprise a button, a camera associated with video recognition means, and/or an RFID detector.

According to one embodiment, entry zones, exit zones and/or stations for the public transport shuttles comprise parking zones equipped with a recharging device or with a battery exchange device. The recharging device may notably be an induction-type electric charger or a reserve of hydrogen.

According to one embodiment, the high-speed-traffic lanes are carried by pylons by means of concrete beams, the uprights that join the beams together, acting as guides for the movement of the vehicles and as noise barriers.

According to one embodiment, the high-speed-traffic, service, entry and exit lanes comprise washed-concrete running surfaces.

According to one embodiment, the high-speed-traffic, service, entry and exit lanes comprise running surfaces which are separated by a space that allows runoff water and other dirt to be removed.

According to one embodiment, the transport system comprises a tunnel having an inside diameter of the order of 7.5 m, through which a first set of two lanes for one of the directions and a second set of two lanes for the other of the directions passes, said second set being arranged above or below the first set; each of the first and second sets of two lanes comprising two high-speed-traffic lanes or one high-speed-traffic lane and one service lane.

According to one embodiment, the transport system comprises a tunnel having an inside diameter of the order of 9.5 m, through which a first set of three lanes for one of the directions and a second set of three lanes for the other of the directions passes, said second set being arranged above or below the first set; each of the first and second sets of three lanes comprising three high-speed-traffic lanes or two high-speed-traffic lanes and one service lane.

According to one embodiment, the uprights act as guides and the onboard sensors are ultrasonic radars positioned at the front, at the rear, and on the sides of the vehicles and able to detect said uprights.

According to one embodiment, the vehicles are each equipped with a control device which comprises a lane-change module for changing lanes between an original lane and a target lane, said lane-change module being connected to said onboard sensors and being configured to:
  detect a lane-change indicator, consisting of a discontinuity in the upright separating the original lane from the target lane or of an optical indicator; or
  processing information indicative of a lane change and delivered by the traffic management device or stored in a memory of the vehicle;
  detect the position of one or more of the uprights of the target lane; and
  control said vehicle in such a way that it shifts away from the original lane toward the target lane according to the lane-change indicator or the information indicative of a lane change and the position of one of the uprights of the target lane.

According to one embodiment, a separation between the two uprights of one of the high-speed-traffic, service, entry and exit lanes in a bend is greater than a spacing between the two uprights of said lane in a straight-line zone.

According to one embodiment, at least one of the vehicles comprises at least four wheels each one equipped with an in-built motor which replaces the motor and each one able to rotate in order to steer the vehicle.

According to one embodiment, at least one of the lanes is equipped with an induction charging device able to deliver a magnetic field and in which at least one of the automotive vehicles or one of the public transport shuttles is equipped with a receiver able to convert the magnetic field into an electrical current so as to recharge a battery.

According to one embodiment, the traveler movements management device is further configured so that preselected public transport shuttles stop at certain stations, to predetermined timetables and for predetermined journeys, so as to pick up the passengers who so wish it, and set down those who wish to leave, according to a scheduled transport.

According to one embodiment, the transport system comprises stations built at ground level, requiring no stairs in order to be used by the travelers and comprising service lanes in the form of access ramps to link the high-speed-traffic lanes.

According to one embodiment, the service lanes comprise zones dedicated to vehicle acceleration and zones dedicated to vehicle deceleration.

According to one embodiment, the vehicles are equipped with video cameras the images from which are passed on to the traffic management device, said traffic management device comprising means for automatically analyzing these images, which means are able to monitor correct operation and detect any potential anomalies.

According to one embodiment, the transport system comprises vehicles equipped with means for automatically cleaning the lanes.

According to one embodiment, the transport system comprises only vehicles equipped with a data memory storage system able to store the information needed for operation of said vehicles in said lanes, said vehicles being designed to run autonomously as far as the next exit lane or as far as the next station using said information stored in memory in the memory storage system.

According to one embodiment, the lanes comprise fiber-reinforced concrete running surfaces.

According to one embodiment, all the motor vehicles and all the public transport shuttles are equipped with an interface with the traffic management device which is able to authorize a passenger to request a stop at the next station or exit zone, for example in an emergency.

According to one embodiment, the stations comprise a zone for parking said shuttles.

According to one embodiment, the transport system comprises a recognition system in front of the platform doors in order to detect whether the traveler is indeed one who made a reservation.

According to one embodiment, the transport system comprises public transport shuttles equipped with a recognition system in order to detect when the traveler who made a reservation is present in the shuttle and when he has left.

According to one embodiment, at least one of the service lanes comprises a part in the form of access ramps making it possible to connect two high-speed-traffic lanes at different levels, a high-speed-traffic lane and a station at different levels, or a high-speed-traffic lane and an entry or exit zone at various levels.

According to one embodiment, the transport system comprises a boarding-alighting lane running alongside the platform of each of the stations and which is connected to a service lane.

BRIEF DESCRIPTION OF THE FIGURES

The invention will be better understood, and further objects, details, features and advantages thereof will become more clearly apparent during the course of the following description of a number of particular embodiments of the invention which are given solely by way of nonlimiting illustration with reference to the attached drawings.

DETAILED DESCRIPTION OF EMBODIMENTS

The transport system seeks both to transport individuals in automotive vehicles and in public transport shuttles. The automotive vehicles like the public transport shuttles of the transport system according to the invention are all able to operate in an automatic mode of operation, which means to say with no intervention by a driver.

Figure 1:
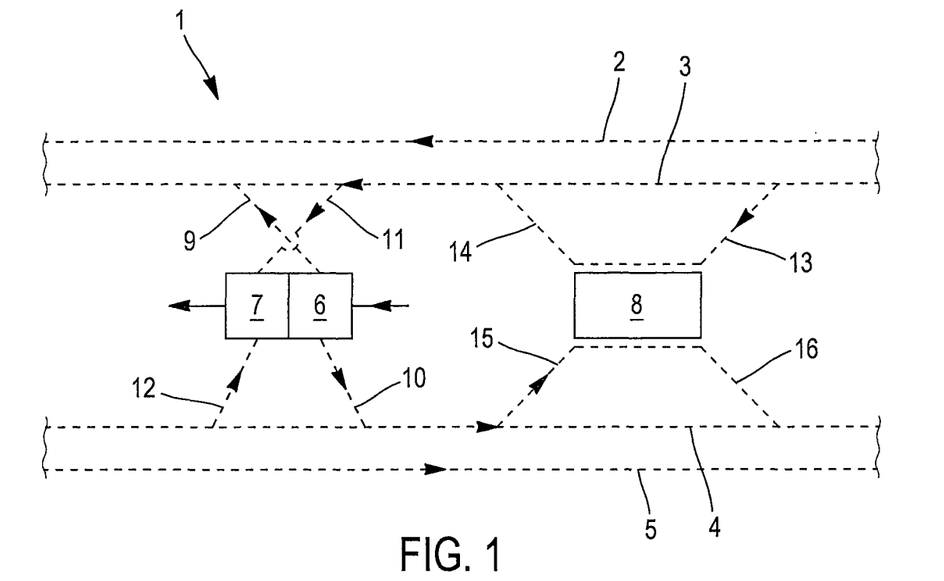
FIG. 1 is a functional and partial depiction of a transport infrastructure of a transport system according to the invention.

FIG. 1 partially and schematically illustrates the intrastructure 1 of the transport system 1 according to one embodiment. The infrastructure 1 here comprises two one-way high-speed-traffic lanes 2, 3, 4, 5 for each of the two directions of travel. circulation. Each of the high-speed-traffic lanes 2, 3, 4, 5 has no intersection, no crossing, no stopping points, namely has no traffic lights or stop panels. The high-speed traffic lanes 2, 3, 4, 5 allow a plurality of entry zones 6 and exit zones 7 for motor vehicles and a plurality of stations 8 for the public transport shuttles to be interconnected to create a hybrid transport network.

As depicted in FIG. 1, each entry zone 6 is connected to a high-speed traffic lane 3, 4 per direction of travel by a dedicated service lane 9, 10. Likewise, each exit zone 7 is also connected to one high-speed traffic lane 3, 4 per direction of travel by a respective service lane 11, 12.

Furthermore, as depicted in FIG. 1, each station 8 for the public transport shuttles is connected upstream and downstream to one high-speed traffic lane 3, 4 per direction of travel, by means of service lanes 13, 14, 15, 16.

Let us note that, in an embodiment which has not been depicted, one or more service lanes each connect a high-speed-traffic lane to both a motor vehicle entry zone or exit zone and a station for the public transport shuttles.

Figure 2:
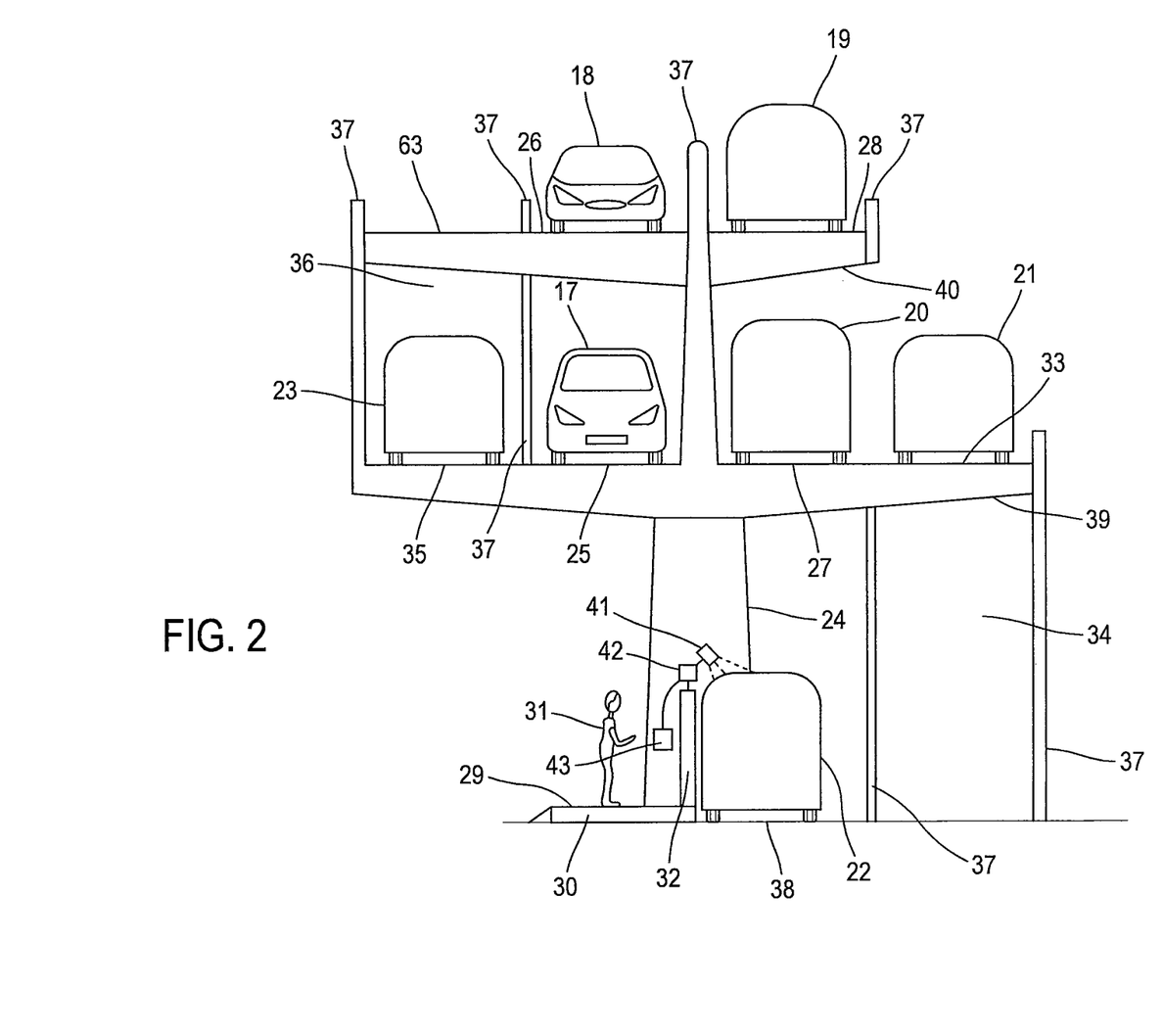
FIG. 2 schematically depicts the transport infrastructure.

FIG. 2 is a simplified depiction of an infrastructure according to one embodiment. The two types of vehicle envisaged, namely automotive vehicles 17, 18 and public transport shuttles 19, 20, 21, 22, 23 travel on this infrastructure. The right-hand side of FIG. 2 represents the direction of travel moving away whereas the left-hand side represents the oncoming direction of travel.

As depicted in FIG. 2, the transport system comprises pylons 24 which support the high-speed-traffic lanes 25, 26, 27, 28. Furthermore, the high-speed-traffic lanes 25, 26, 27, 28 are superposed on at least two levels, one on top of the other. By way of example, the high-speed-traffic lanes 26, 28 arranged at the upper level are intended to receive vehicles 18, 19 traveling at the highest speeds, whereas the high-speed-traffic lanes 25, 27 arranged at the intermediate level are intended to receive vehicles 17, 20 traveling at lower speeds.

FIG. 2 also depicts a station 29 for the public transport shuttles, which is arranged at ground level. Thus, in this example, the station 29 does not need an additional roof because it lies underneath the high-speed-traffic lanes 25, 26, 27, 28 of the transport system. This station 29 comprises a platform 30 able to receive travelers 31. Thus, the station 29 does not require stairs in order to allow the travelers 31 to access the platform 30. The platform 30 is advantageously equipped with one or more platform doors 32.

In order to allow the public transport shuttles 19, 20, 21, 22, 23 traveling along the high-speed-traffic lanes 25, 26, 27, 28 to access the station 29, the transport system comprises service lanes part of which is produced in the form of access ramps. For example, in FIG. 2, the service lane 33 is extended by an access ramp part 34 so as to allow the public transport shuttle 21 to reach the station 29 on the ground, by turning onto the boarding-alighting lane 38 that runs alongside the platform 30. The public transport shuttles may thus position themselves, like the public transport shuttle 22, in front of a platform door 32 of the station 29. The transport system also comprises service lanes, such as the service lane 35, of which part produced in the form of an access ramp 36 allows access to the higher level and, more particularly, to a service lane providing access to a high-speed-traffic lane 26 on the level above, from a high-speed-traffic lane 25 of a level below, or even directly from an entry zone or from a station 29. The access-ramp parts 34 and 36 of the service lanes are depicted very schematically in order not to make FIG. 2 complicated.

Although FIG. 2 does not depict entry and exit zones for the automotive vehicles, said entry zones are arranged at ground level, underneath the high-speed-traffic lanes 25, 26, 27, 28 and are each connected to one or more high-speed-traffic lanes by one or more service lanes each comprising an access ramp part.

However, in other embodiments, the vehicle entry and exit zones may be arranged differently, notably being kept even further away from the high-speed-traffic lanes 25, 26, 27, 28 of the transport system, particularly when there is a lack of space or in order to connect the transport system to mass-circulation lanes or to a parking area.

Furthermore, according to one embodiment, the automotive vehicles are able to be used for transporting goods. So, the transport system may be equipped with entry and exit zones dedicated to the carriage of goods, for picking up and setting down goods or so that an automotive vehicle can be taken back over by a driver who is performing the final delivery.

The high-speed-traffic lanes 25, 26, 27, 28 and the service lanes 33, 35 are each bounded, on each side, by uprights 37. By way of example, the uprights 37 project by a height of approximately 50 cm above the high-speed-traffic lanes 25, 26, 27, 28 and service lanes 34, 35. The high-speed-traffic lanes 25, 26, 27, 28 and the service lanes 33 do not, however, have such uprights 37 between two adjacent lanes in each zone dedicated to a change in lane between the two adjacent lanes. Such a zone dedicated to a lane change is depicted between the high-speed-traffic lane 27 and the service lane 33 in FIG. 2.

Furthermore, while for the sake of not overburdening FIG. 2 no emergency walkway has been depicted therein, the transport system may comprise emergency walkways that can be used in the event of vehicle failure. These are preferably created between the uprights of two adjacent high-speed-traffic lanes, preferably on the side on which the doors of the public passenger transport shuttles open, when the shuttles have doors on only one side According to one exemplary embodiment, the running surfaces of the high-speed-traffic lanes 25, 26, 27, 28 and the service lanes 33 are made of washed concrete. Washed concrete is advantageous in that the road noise and grip characteristics of a washed-concrete running surface are equivalent to those of an asphalt running surface, whereas its life is thirty years, namely six times higher than an asphalt one. Furthermore, the running surfaces of the high-speed-traffic lane 25, 26, 27, 28 and of the service lanes 33, 34 are separated from one another by a space which allows runoff water and other dirt to be removed automatically, without the need for a porous material for the running surface. This is particularly advantageous when the running surfaces are made of washed concrete.

According to an alternative form of embodiment, the washed concrete is replaced by fiber-reinforced concrete, particularly high-performance fiber-reinforced concrete which contributes to the strength of the infrastructure.

The high-speed-traffic lanes 25, 26, 27, 28 and the service lanes 33, 34 are supported by the pylons 24 by means of transverse beams 39, 40, for example made of concrete. In one advantageous embodiment, the uprights 37 also provide an inter-connection of the transverse beams 39, 40 of one and the same level with one another. As we shall see later, the uprights 37 are also able to serve to guide the vehicles along the high-speed-traffic lanes 25, 26, 27, 28 and the service lanes 33, 34 and/or to act as noise barriers.

The transverse beams 39, 40 and the pylons 24 of the transport system may be prefabricated at the factory, transport by road relatively easily, and then installed on the sites with handling means of reasonable size.

Of course, in sections where there is neither a station nor an entry or exit zone, the transport system is even simpler because it merely comprises four high-speed-traffic lanes 25, 26, 27, 28, one faster lane 26, 28 per direction of travel on the upper level and one less-fast lane 25, 27 per direction of travel on the intermediate level. The high-speed-traffic lanes 25, 26, 27, 28 are then support by transverse beams 39, 40 of a shorter length. Furthermore, in that case there is nothing on the ground other than the base of the pylons 24.

It should be noted that FIG. 2 depicts an exemplary embodiment of the transport system according to the invention which, despite its simplicity, allows for a potential capacity of 40 000 travelers per hour per direction of travel, as is explained a little later on, which corresponds to the capacity of a latest-generation automatic metro system.

In a simplified embodiment of the transport system, the latter comprises just one high-speed-traffic lane per direction of travel. Thus, the transport system comprises just one level of high-speed-traffic lanes which is supported by the pylons 34 by means of beams of shorter length.

In another simplified embodiment, the transport system comprises, at least locally, just one direction of travel and just one high-speed-traffic lane, particularly for streets which are not wide enough to be able to accommodate several directions of travel.

As mentioned previously, the stations 29 are preferably at ground level, in order to avoid stairs and thus improve pedestrian access. Thus, as explained previously, it is therefore the public transport shuttles which serve the stations 29. In order to reduce the footprint at ground level, the two platforms 30 of a station 29 corresponding respectively to each of the two directions of travel may, rather than facing one another, be offset from one another.

Each platform 30 is preferably equipped with automated platform doors 32 which, when open, allow the travelers 31 to move from the platform 30 to one of the public traveler transport shuttles, and vice versa. The small stations comprise just two or three platform doors 32 per direction of travel whereas the large stations may have fifteen or twenty or even more of them, depending on the desired throughput.

The automated platform doors enjoy the benefit of very positive feedback in automatic metro systems and acceptance by users.

According to a preferred embodiment, the platform doors 32 are associated with presence detectors 41 able to detect the presence of a public transport shuttle in front of each of the platform doors 32 and with means for automatically controlling the platform doors 32 which means are able to trigger the opening of one of the platform doors 32 in response to the detection of a transport shuttle in front of said platform door 32. By way of example, the presence detectors 41 are ultrasound detectors or video cameras associated with means for processing the video signals.

Furthermore, according to an alternative form of embodiment, the platform doors 32 are also associated with warning means 43 able to deliver to the means 42 that automatically control the platform doors a warning signal when at least one traveler 31 is stationed in front of one of the platform doors 32. The warning means 43 may notably comprise a push-button, a camera associated with video recognition means and/or an RFID detector. According to an alternative form of embodiment, in order to detect that a traveler is indeed one who has made a reservation for a journey in said shuttle, a recognition system may be used, such as an electronic interface that allows the traveler to input an identifier or a terminal or a panel with RFID, NFC, fingerprint recognition, facial recognition or iris recognition detection.

According to an alternative form of embodiment, the public transport shuttles have analogous recognition means for detecting the presence in the shuttle of the passenger who has made the reservation, once he or she has entered and as soon as he or she leaves.

Such stations 29 are able to handle large flows of travelers. By way of example, the public transport shuttles may arrive every 60 seconds, namely 60 vehicles per hour per platform door and 480 travelers per hour for public transport shuttles with a mean capacity of eight travelers. Thus, for a platform 30 comprising 25 platform doors for a length of around 150 meters, the maximum capacity of the station is of the order of 12 000 travelers per hour.

In a preferred version of the transport system, the public transport shuttles 19, 20, 21, 22, 23 station themselves in front a platform door 32 after having left the service lane 34 to free up the service lane for the time taken for travelers to board/alight and not impede the other vehicles approaching or coming from another platform door 32. According to a preferred version, the public transport shuttles 19, 20, 21, 22, 23 are equipped with four steered wheels, and this makes it possible to improve their maneuverability and, therefore, to optimize the distance between two platform doors 32.

In addition, advantageously, at least certain stations 29 are equipped with turn-around lanes that allow the public transport shuttles 19, 20, 21, 22, 23 which have set down all their travelers, to go back in the other direction with a change of lane.

According to another alternative form of embodiment, the public traveler transport shuttles 19, 20, 21, 22, 23 are able to operate just as easily forward or backward. In that case, the public traveler transport shuttles 19, 20, 21, 22, 23 are equipped with a door on each side and with four steered wheels. Furthermore, the stations are simply equipped with parking zones that allow the public transport shuttles 19, 20, 21, 22, 23 to park while waiting to return in the other direction. Advantageously, these parking zones are equipped with a recharging device or with a battery exchange device. The recharging device may notably be an induction-type electric charger or a hydrogen reserve.

The turn-around lanes have the disadvantage of being bulkier but offer the advantage of being "FIFO", which means to say that the first public transport shuttle in is the first out, thereby optimizing the potential recharging time.

Figure 3:
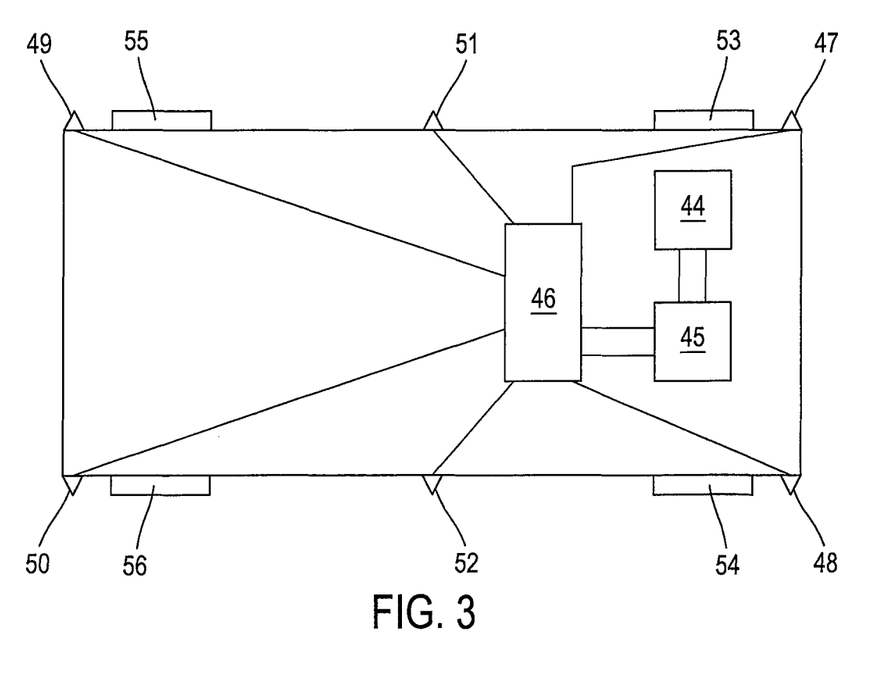
FIG. 3 schematically illustrates a vehicle of the transport system.

The overall structure of a vehicle of the transport system, whether this be a public transport shuttle 19, 20, 21, 22, 23 or an automotive vehicle 17, 18 is described in connection with FIG. 3. Each vehicle comprises four wheels 53, 54, 55, 56 equipped with tires, which makes it possible to reduce the road noise both inside and out and provide better comfort. At least two 53 54 of said wheels are steered. Each vehicle comprises at least one electric motor 44 intended to provide at least part if not all of the propulsion of said vehicle. Each vehicle also comprises an electric battery 45 intended to power the electric motor 44 at least in part.

Each vehicle also comprises a central unit 46 comprising a processor, as well as a memory and communications means, for example using radio transmission, allowing the central unit 46 to communicate with transport system equipment detailed hereinafter.

Moreover, each vehicle comprises onboard sensors 47, 48, 49, 50, 51, 52. The central unit 46 comprises a control device which is configured to control said vehicle according to signals delivered by said sensors 47, 48, 49, 50, 51, 52. The control device has at least one automatic operation mode in which said control device guides the vehicle, with no intervention on the part of a driver, by means of the steered wheels 53, 54 and the onboard sensors 47, 48, 49, 50, 51, 52.

According to a preferred version of the invention, the onboard sensors 47, 48, 49, 50, 51, 52 are ultrasonic radars positioned on the sides of the vehicles, at the front, at the rear and, if necessary, in the center, with redundancy. The ultrasonic radars are thus able to detect the lane guides, namely the uprights 37 positioned on each side of the traffic and service lanes. By virtue of the signals delivered by such onboard sensors 47, 48, 49, 50, 51, 52, the control device is able to position the vehicle in the center of the traffic lanes and service lanes, by positioning itself equal distances from the uprights 37.

Let us note that, in one embodiment, in order to take into consideration the fact that uncertainties on the positioning of the vehicles within the lane increase in bends or when the speed is higher, and the fact that the risks associated with an uncertainty regarding the positioning of the vehicles increases in such circumstances, the spacing between the uprights 37 that act as guides is greater in the bends than in straight lines and is greater on one lane than on another when said lane is intended to be used at a maximum speed that is higher than that of the other lane.

Furthermore, according to one embodiment, the onboard sensors 47, 48, 49, 50, 51, 52 mentioned above are supplemented by other sensors positioned at the front and at the rear of the vehicle, these sensors being for example video cameras, infrared cameras, lidars which make it possible to determine the position of the vehicle with respect to the edges of the lanes and also make it possible to detect obstacles, such as other vehicles, at the front and at the rear of the vehicle. Thus, by virtue of the signals delivered by such sensors, the control device is able to anticipate automatic emergency braking and allow the vehicle to slot into a stream of vehicles when changing lane.

Moreover, the control device comprises a lane-change module for changing lane between an original lane and a target lane. The lane-change module is configured to detect the presence of a zone that allows a change of lane. In order to do this, according to a first alternative form of embodiment, the lane-change module is configured to detect a lane-change indicator, this for example consisting of a discontinuity in uprights 37 separating the original lane from the target lane, or of a dedicated optical indicator. According to a second alternative form of embodiment, the lane-change module is able to process information indicative of a change in lane which is either delivered by a traffic management device, described in detail later on, or stored in the memory of the central unit.

Furthermore, the lane-change module is able to control the vehicle in such a way that it moves out from the original lane toward the target lane according to the lane-change indicator or the information indicative of a change of lane and the position of the upright 37 of the target lane which is arranged on the opposite side to the original lane. The path during the lane change can be reinforced by known means such as ground markings detected by the video cameras of the vehicle or a magnetic guide detected by magnetic detectors.

Thus, in operation, as soon as a vehicle has detected the presence of a zone that allows for a lane change, either said vehicle maintains its distance with respect to the upright 37 of the original lane which is positioned on the opposite side to the other adjacent lane if it wishes to continue in the same lane, or it turns toward the target lane. If the vehicle turns toward the target lane, it positions itself at a predefined distance from the upright 37 arranged on the opposite side to the original lane. When the second upright 37 of the destination lane reappears, the control device of the vehicle then controls the vehicle in such a way that it positions itself equal distances from the two uprights 37. Similarly, if the vehicle continues in its original lane, it repositions itself, if need be, equal distances from the two uprights 37 after a certain time, so as not to jerk the steering.

Furthermore, if the lane change is from a service lane to a high-speed-traffic lane, the lane-change module is configured to increase the speed of the vehicle in the service lane up to a setpoint speed recommended or imposed by the traffic management device.

Contrastingly, if the lane change is from a high-speed-traffic lane to a service lane, the lane-change module is configured so that the vehicle changes line (after possibly slowing down without impeding the vehicles behind) and then to reduce the speed of the vehicle down to a setpoint speed recommended or imposed by the traffic management device.

In the above description, the lane change is managed, for each vehicle, by a lane-change module which is implemented in each of the vehicles. However, in other embodiments, the change of lane of the vehicles is managed collectively by the traffic management device.

Furthermore, the transport system comprises an automotive vehicle movements management device.

The automotive vehicles movements management device is notably intended to remit an access certificate to an automotive vehicle wishing to access the transport system. The automotive vehicles movement management device comprises a memory, a processor, communication means and hardware and/or software means allowing it to implement the functionalities detailed hereinafter.

Figure 4:
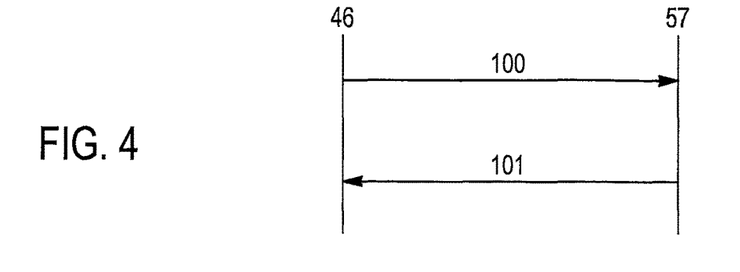
FIG. 4 is a diagram schematically illustrating the operation of the automotive-vehicle movements management device.

FIG. 4 is a diagram schematically illustrating the operation of the automotive vehicles movement management device 57.

The automotive vehicles movement management device 57 is configured to receive a request 100 containing identification information associated with a motor vehicle, departure or arrival time information, and information indicative of a journey from one of the entry zones to one of the exit zones. Such a request 100 may notably be emitted by the central unit 46 of the automotive vehicle or by any suitable electronic interface such as a computer, a phone or a terminal located for example near an entry zone. The automotive vehicles movement management device 57 is also configured to determine a variable indicative of an estimate of the level of traffic in the lanes to which said request relates according to said time information and to said information indicative of a journey. In order to do this, the automotive vehicles movement management device 57 is capable of using statistical data stored in its memory and/or of communicating with the traffic management device in order to obtain real-time information regarding the level of traffic in the lanes concerned. Thereafter, the automotive vehicle movement management device 57 compares the variable indicative of an estimate of the level of traffic against a threshold value and when the variable indicative of an estimate of the level of traffic is below said threshold value delivers an access certificate 101 to the central unit 46 of the automotive vehicle associated with the identification information. As we shall see later on, such an access certificate is needed in order for the vehicle to gain access to the high-speed-traffic lanes.

In other words, the motor vehicle movement management device 57 allows the vehicle to access the high-speed-traffic lanes only when the intended journey does not involve traffic lanes liable to result in an excessive flow of vehicles. This makes it possible to avoid saturating the lanes.

If the variable indicative of an estimate of the level of traffic is above a threshold value, the automotive vehicle movement management device 57 refuses to grant an access certificate corresponding to the request 100 received. However, according to one advantageous embodiment, the automotive vehicle movement management device 57 is able to transmit a proposed alternative request containing alternative departure or arrival time information or even information indicative of an alternative route.

Figure 6:
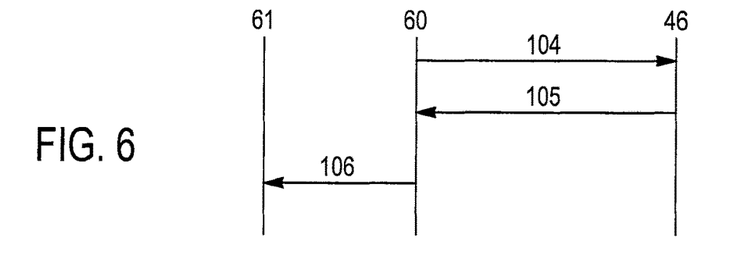
FIG. 6 is a diagram illustrating the operation of an access control device.

Furthermore, each entry lane of the motor vehicle entry zones 6 is equipped with an access control device 60 the operation of which will be detailed hereinafter in connection with FIG. 6.

The access control device 60 comprises a memory, a processor, means of communicating with the automotive vehicles, for example by radio transmission, and hardware and/or software means allowing it to implement the functionalities detailed hereinbelow.

When an entering automotive vehicle reaches an entry lane, the access control device 60 determines a plurality of specific characteristics of the entering automotive vehicle, compares each one of them against a respective guideline, for example stored in the memory, and, on the basis of the aforementioned comparisons, decides whether to grant or refuse said motor vehicle access to the high-speed-traffic lanes.

According to one preferred embodiment, the access control device notably verifies that an access certificate granted by the motor vehicle movements management device 57 is indeed associated with the motor vehicle that is entering.

According to one embodiment, the access control device 60 is able to transmit to the central unit 46 of each entering automotive vehicle a request to demand information 104 and the central unit 46 of each automotive vehicle is able to transmit, in response to said request to demand information 104, a signal indicative of the information requested 105. Alternatively or in addition, the access control device 60 may also comprise means for acquiring specific characteristics of each automotive vehicle, such as sensors or a camera notably making it possible to measure the dimensions of the automotive vehicle and/or a device for measuring the weight of the vehicle.

By way of example, the specific characteristics of the automotive vehicle liable to be taken into consideration by the access control device 60 comprise one or more of the following characteristics: the existence of a certificate of access to the transport system, homologation information, dimensions (width, length and/or height), weight, range autonomy, range autonomy with respect to the requested journey and the state of health of said entering automotive vehicle. Thus, by virtue of an access control device 60 that carries out such preliminary checks, the risk of a breakdown within the transport system is reduced.

According to an advantageous alternative form, the access control device 60 is associated with equipment 61, such as a mobile barrier or signaling equipment which is controlled by a signal 106 according to the decision taken by the access control device 60 and thus allows the decision of the access control device 60, namely whether to authorize access to the high-speed-traffic lanes or to refuse access to be physically embodied by directing the automotive vehicle to a parking zone or to a turn-around lane.

Furthermore, according to one advantageous embodiment, the access control device 60 comprises complementary means for dynamically checking the entering vehicle. These complementary means notably comprise a camera and/or sensors as well as signal processing means which are configured to determine one or more of the following parameters: the course followed by the vehicle, the speed with respect to a setpoint speed, the ability of the vehicle to accelerate and the ability of the vehicle to decelerate. The access control device 60 is also able to compare each of the envisaged parameters against a respective guideline and to authorize or refuse said entering automotive vehicle access to the high-speed-traffic lanes.

Figure 7:
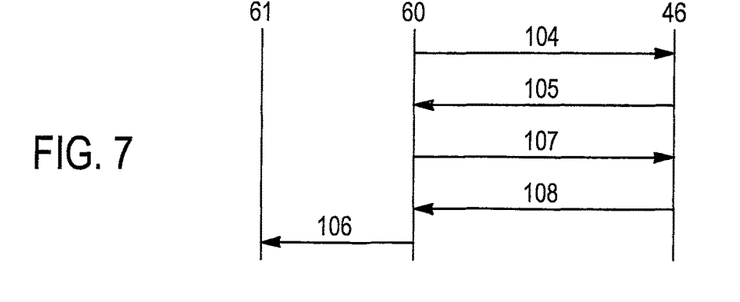
FIG. 7 is a diagram illustrating the operation of an access control device according to an alternative form of embodiment.

Moreover, for greater safety, it is sensible for the automotive vehicle to be switched to fully automatic operation, when stationary, before it leaves the entry zone heading for the high-speed-traffic lanes, and for the driver to be formally informed that he can no longer drive. In other words, the access control device 60 is also configured to impose an automatic mode of operation on the entering vehicle authorized to gain access, as indicated in the diagram of FIG. 7.

In order to do this, according to the alternative form of embodiment depicted in FIG. 7, after having carried out the preliminary checks detailed hereinabove, the access control device 60 is able to transmit to the central unit 46 of each entering automotive vehicle a request 107 imposing operation in automatic mode.

In response to this request, the central unit 46 of the automotive vehicle is able to transmit to the access control device 60 a signal 108 confirming that the automotive vehicle is in the automatic mode of operation, if it is, and/or to generate an audible or visual signal informing the driver of the need to initiate the automatic mode of operation.

According to another alternative form of embodiment, the central unit 46 of the automotive vehicle automatically initiates operation in automatic mode in response to a request imposing operation in automatic mode.

Furthermore, the access control device 60 is configured to transmit to each entering automotive vehicle a signal for locking the automatic mode. In response to receipt of such a signal for locking the automatic mode, the central unit 46 of the motor vehicle renders the following controls inoperative for the driver: the controls for steering, accelerating, braking, gear selection, starting and stopping the motor vehicle, until such point as said vehicle receives a signal for unlocking the automatic mode.

Furthermore, each exit zone comprises at least one exit lane allowing the automotive vehicles to leave the transport system. Each exit lane comprises an exit device configured to transmit to each leaving automotive vehicle a signal for unlocking the automatic mode so as to render the aforementioned various functionalities of the automotive vehicle operative when this vehicle leaves the transport system and allowing said driver to take back control of the movement of his vehicle.

At the exit, the automotive vehicles head directly into the street or into the entrance of a parking facility (with the possibility of leaving the vehicle to park itself in the parking facility, because compliant vehicles will be fitted with everything they need to allow this automatic parking).

Figure 8:
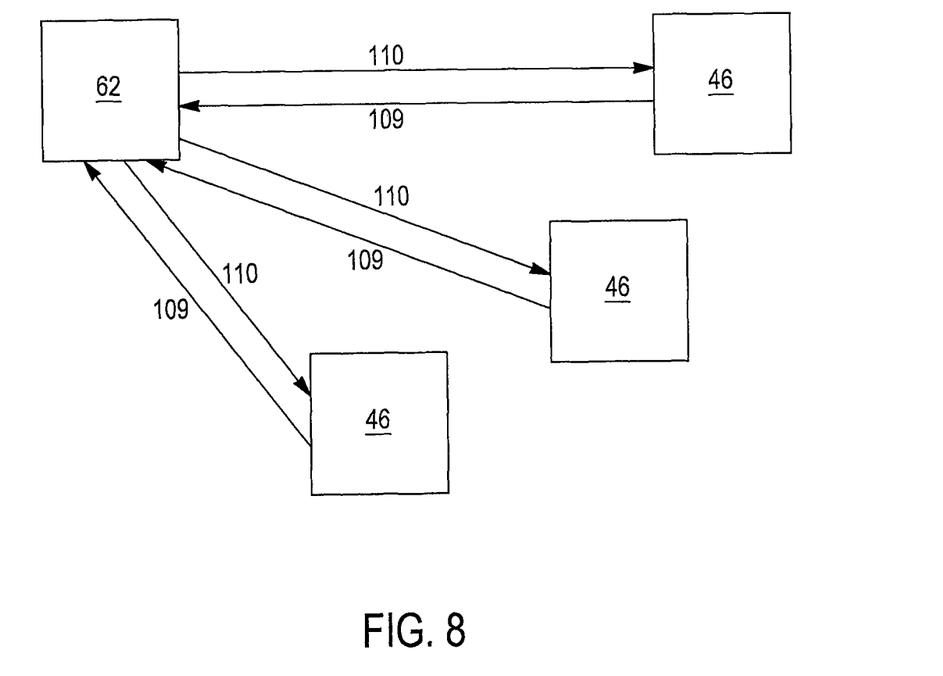
FIG. 8 schematically illustrates the operation of a traffic management device.

In connection with FIG. 8, it may be seen that the transport system also comprises a traffic management device 62. The traffic management device 62 comprises a memory, a processor, means of communication with the vehicles, by radio transmission for example, and hardware and/or software means allowing it to implement the functionalities detailed hereinbelow.

The traffic management device 62 communicates with the central unit 46 of the vehicles circulating in the transport system. Each of the vehicles communicates information 109, and notably its geographical position and its route, to the central unit.

Alternatively, sensors, for example using RFID technology, may be positioned along the lanes and deliver to the traffic management device 62 information regarding the geographical position of the vehicles.

In addition, according to an alternative form of embodiment, the vehicles are equipped with video cameras the images of which are passed on to the traffic management device 62.

The traffic management device 62 is configured to deliver to the central unit 46 of each vehicle running on the lanes of the transport system speed setpoints 110 dependent on the high-speed-traffic or service lane in which said vehicle is running, on the route and according to information indicative of the number, the geographical position and the speeds of the other vehicles traveling in said lanes.

In order to optimize traffic flow, the traffic management device 62 notably assigns faster or slower speed setpoints to the vehicles according to whether they are running on the first or second high-speed traffic lane of one and the same direction of travel.

Moreover, according to one embodiment of the invention, the traffic management device 62 is associated with dynamic control means, similar to those described hereinabove, and is thus able to transmit to the central unit 46 of a motor vehicle an instruction to go to the next station or exit zone when a failure or an insufficient range autonomy has been detected.

The traffic management device 62 may also comprise means of automatically analyzing the images transmitted by the vehicles, said means being able to check correct operation of the network and detect any anomalies there might be.

Advantageously, the automotive vehicles and public transport shuttles are entirely autonomous on the network, and follow only speed guidelines given by the traffic management device. This is of particular relevance in terms of operational safety. Furthermore, the central unit of the vehicles is able to store specific speed setpoints so that if the traffic management device breaks down or if there are problems with communications between it and the central unit 46, the vehicle is able in automatic mode to get to the next station in the case of the shuttles or the next exit zone in the case of the automatic vehicles. This avoids the transport system becoming paralyzed as it could in a system in which the vehicles were controlled continuously, by a control system, such as in present-day automatic metro systems.

Figure 5:
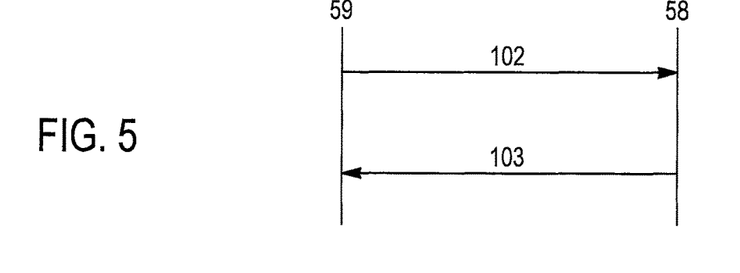
FIG. 5 is a diagram schematically illustrating the operation of the traveler-movements management device.

Furthermore, the transport system comprises a traveler movements management system. FIG. 5 is a diagram schematically illustrating the operation of the traveler movements management device 58.

The traveler movements management device 58 seeks to implement on-demand transport that is able to meet the punctuality and efficiency needs of the travelers. Thus, a traveler on the public transport system may choose his departure station, his arrival station, and his desired departure time via a suitable electronic interface and a public transport shuttle comes to the chosen station and carries the traveler directly to his destination station. Such on-demand transport is economically viable because of the small dimensions of the public transport shuttles.

In order to do this, the traveler movements management device 58 is able to receive a request 102 from a traveler comprising time information, information indicative of a journey from a starting station to an arrival station. The request 102 can be formulated from any suitable electronic interface 59, via a device connected to the internet, via a phone or via a terminal installed at a station for example. In response to this request 102, the traveler movements management device 58 delivers to said electronic interface 59 information 103 relating to a departure time of a public transport shuttle and to a position of said public transport shuttle on the platform of the station.

Advantageously, the traveler movements management device 58 is also configured to determine the route taken by the public transport shuttles according to a plurality of traveler requests received, so as to optimize the filling of the public transport shuttles.

In addition, the traveler movements management device 58 advantageously has means for processing statistical data to make it possible to optimize the positioning of the traveler vehicles at the approaches to the most heavily used stations using statistics and predictions of journey requests and/or making it possible alternatively to quickly increase the frequency of the shuttles without needing to mobilize personnel.

The capacity of the transport system according to the invention is, for a version comprising one single lane per direction of travel, greater than the capacity of a motorway comprising 2 carriageways each of 2 lanes, and achieves this with a footprint at ground level which is at least a factor of 6 smaller.

According to one embodiment, the public transport shuttles are vehicles of dimensions similar to those of a motorcar and therefore far smaller than a bus, a truck, a tram or a train, and have almost "car-like" comfort with wide access and a floor at a level that allows ease of access to individuals with reduced mobility, pushchairs and wheelchairs. In addition, in the case of a wheelchair, the information can be supplied to the manager of the traveler transport system so that he avoids overloading the public transport shuttle.

The public transport shuttles preferably have 4, 5 or 6 seated places, with the possibility in peak periods of accommodating 8 or even 10 individuals in total, this being with external dimensions, for example a length of 4 m, a width of 2 m and a height of 2.3 m that are sufficient to be able to accommodate travelers who are standing.

Certain public transport shuttles may take only seated passengers and therefore have a lower height, for example of around 2 meters. Finally, a weight limit of 2.6 or 2.8 metric tons would allow 10 travelers to be accommodated while at the same time limiting the axle weight and therefore the dimensions of the infrastructure.

According to one embodiment, certain vehicles, motorcars or public transport shuttles, have just two places, or even single occupancy.

There may be longer vehicles for accommodating more passengers, preferably maintaining the same height, width and axle weight limitations, or several vehicles can be coupled together (either physically or by a virtual link) in order to execute part of the journey together.

The automotive vehicles may be personal vehicles, cars used in a car-share or vehicles intended for the commercial carriage of passengers, such as Private Hire Vehicles (PHVs) or taxis. The automotive vehicles may also be goods transport vehicles such as Light Commercial Vehicles LCVs and have a loading capacity of more than 4 $m^3$, such as an electric Nissan eNV200 and a payload of 1 metric ton, with the same 2.6 or 2.8 metric tons load limit if necessary.

Certain automotive vehicles may be hybrid vehicles, particularly in the case of long distances.

The transport system may impose the compulsory folding-in of rear-view mirrors, particularly in order to comply with width limits.

Advantageously, the automotive vehicles like the public transport shuttles are equipped with an interface with a control station so that an individual can ask to stop at the next station, for example in an emergency.

The reduced dimensions (in comparison with a bus, a tram or a metro system) allows the creation of overhead lanes that have a small visual impact and require a small amount of materials, all of them recyclable, while reducing the duration of the work which is often a source of disturbance, and which lanes can even easily be installed in streets of average size.

Finally, one of the very great problems in the field of transport is congestion. The transport system according to the invention advantageously using lanes mounted on pylons makes it possible to increase the number of traffic lanes on a given site, thereby reducing the risks of congestion without reducing the area dedicated to the other means of getting around.

The lanes may be partially or fully covered, and their architecture or appearance may be designed in accordance with the regions through which they pass.

In a highly favored version of the invention, the vehicles run only on electricity and do not emit any atmospheric pollution locally.

In a preferred version of the invention, all the vehicles are autonomous in terms of energy, at least in part, so that they can accomplish all or part of the routes autonomously.

For that, it is preferable to have vehicles equipped with a battery. They can be recharged by induction along the lanes. They can also run on hydrogen or be powered by any other preferably nonpolluting means.

Because the transport system preferably uses overhead lanes, it has a very small footprint at ground level. Another advantage of the transport system according to the invention is the possibility of creating lanes in both directions, using rail tracks (possibly abandoned), particularly those which are single-track lines and which allow trains only to run in each direction alternately. With the transport system according to the invention it is possible, along these single-track railway lines, to install lanes on pylons, freeing up area at ground level and also eliminating potential level crossings, for greater safety.

The lanes may also be installed above or beside railway tracks that are still in service. Likewise, the lanes may be installed alongside a road, a motorway, in the middle or at the sides. The lanes may also use existing bridges.

Of course it is sometimes necessary to run the lanes through a tunnel. Because of the small dimensions of the lanes and of the vehicles, it is possible to create small diameter tunnels which are less expensive than large diameter tunnels. In particular, in a tunnel with an inside diameter of 7.5 m it is possible to create two sets of two superposed lanes with, at the top, one fast lane and a second fast lane or a service lane and, underneath, one fast lane and a second fast lane or a service lane.

In a tunnel with an inside diameter of 9.5 m, it is even possible to create two lots of three superposed lanes with, at the top, one service lane and two fast lanes, one of them a very fast lane and, underneath, one service lane and two fast lanes, one of them a very fast lane. Thus, in a tunnel of a diameter equivalent to that of a metro tunnel, it is possible to have a throughput equivalent to that of a latest-generation automatic metro system of the order of 40 000 travelers per hour, but with a potential speed of 80 to 100 km/h on the fastest lane, or even more, allowing far shorter journey times.

In any case, the system can use decommissioned existing tunnels.

Another advantage of the transport system according to the invention is the multifunction aspect and the possibility for it to be substituted for almost all land-based public transport systems. Specifically, by combining private transport with public transport over short journeys of 3/5 km in very dense regions, but also able to be used for very long journeys of several hundred km.

The transport system may also allow automotive vehicles to perform car sharing by stopping at traveler stations in order to pick up and set down travelers in order to optimize the filling of said vehicles. It may possibly be preferable for the car-share picking-up and setting-down to be done at specific stations.

The transport system may use special automatic lane-cleaning vehicles which do not require a driver. These vehicles may potentially be remote controlled by an operator situated for example at a control post.

Although the invention has been described in connection with a number of particular embodiments, it is quite obvious that it is not in any way restricted thereto and that it comprises all technical equivalents of the means described and combinations thereof where these fall within the scope of the invention.

The use of the verbs "comprise", "have" or "include" and conjugated forms thereof does not exclude the presence of elements or steps other than those listed in a claim.

In the claims, any reference sign between parentheses should not be interpreted as imposing a limitation on the claim.

The invention claimed is:

1. A transport system comprising:
vehicles each of which is equipped with tires, with at least one electric motor (44) and with an internal energy reserve (45) which at least partially contribute to the propulsion of said vehicle, with onboard sensors (47, 48, 49, 50, 51, 52) and with steered wheels (53, 54), said vehicles being, on the one hand, automotive vehicles (17, 18) able to operate in an automatic mode in which the driver plays no part in controlling the automotive vehicle, and, on the other hand, collective passenger transport shuttles (19, 20, 21, 22, 23) able to operate automatically and driverlessly, said vehicles being able to guide themselves using the onboard sensors and the steered wheels;

a plurality of one-way high-speed-traffic lanes (2, 3, 4, 5, 25, 26, 27, 28) comprising at least one traffic lane per direction of traffic, said high-speed-traffic lanes each having no intersections, having no crossings, having no stopping points;

a plurality of service lanes (9, 11, 10, 12, 13, 14, 15, 16, 33, 35) allowing said vehicles access to the high-speed-traffic lanes and connecting said high-speed-traffic lanes to entry zones (6) for the automotive vehicles, to exit zones (7) for the automotive vehicles and to stations (8, 29) for the public transport shuttles;

the entry zones (6) for the automotive vehicles comprising entry lanes which are each connected to at least one high-speed-traffic lane by a service lane (9, 10); each entry lane comprising an access control device (60) configured to:

determine at least one specific characteristic of an entering automotive vehicle, chosen from among an access certificate, homologation information, dimensions, the weight, the range autonomy and the state of health of said entering automotive vehicle;

compare said at least one checked specific characteristic against a guideline;

allow or refuse the automotive vehicle access to the high-speed-traffic lanes, according to said comparison; and force an entering automotive vehicle with access authorization to operate in automatic mode and transmit to said entering automotive vehicle a signal to lock the automatic mode; said automotive vehicles being designed to, in response to receipt of said signal for locking the automatic mode, render the controls for steering, accelerating, braking, gear selection, starting and stopping the automotive vehicle inoperative by the driver;

the exit zones (7) for automotive vehicles being connected to the high-speed-traffic lanes by service lanes (11, 12) and comprising exit lanes, each exit lane comprising an exit device configured to transmit to each leaving automotive vehicle a signal to unlock the automatic mode; said automotive vehicles being designed to, in response to receipt of said signal for unlocking the automatic mode, render the controls for steering, accelerating, braking, gear selection, starting and stopping the automotive vehicle operative by the driver and allow said driver to resume control of the movement of his vehicle;

the stations (8, 29) for the public transport shuttles each comprising a platform (30) allowing travelers to enter or leave one of the public transport shuttles, said stations for the public transport shuttles each being connected to at least one traffic lane by at least two service lanes, these respectively being a departure and an arrival service lane;

a traffic management device (62) configured to deliver to each vehicle traveling on the high-speed-traffic and service lanes of the transport system speed setpoints dependent on the high-speed-traffic or service lane on which said vehicle is traveling and dependent on information indicative of the number, geographical position and speeds of the other vehicles traveling in said lanes.

2. The transport system as claimed in claim 1, further comprising an automotive-vehicle movement management device (57) that is configured to:

receive a request comprising identification information associated with an automotive vehicle, departure time information and information indicative of a journey from one of the entry zones to one of the exit zones;

determine a variable indicative of an estimate of the level of traffic on the lanes affected by said request according to said departure time information and said information indicative of a journey;

compare the variable indicative of an estimate of the level of traffic against a threshold value; and deliver to the automotive vehicle associated with the identification information an access certificate when the variable indicative of an estimate of the level of traffic is below said threshold value;

each access control device (60) being configured to determine whether an automotive vehicle is associated with an access certificate and to authorize access by said automotive vehicle when it is associated with an access certificate.

3. The transport system as claimed claim 1, further comprising a traveler movements management device (58) configured to:

receive a request from a traveler comprising time information, information indicative of a journey from a departure public transport shuttle station to an arrival public transport shuttle station;

in response to said request, deliver to the traveler personal information relating to a departure time of a public transport shuttle and personal information relating to a position of said public transport shuttle on the platform of the departure public transport shuttle station.

4. The transport system as claimed in claim 3, in which the traveler movements management device (58) is further configured to determine a journey of a public transport shuttle according to a plurality of traveler requests received in such a way as to optimize the filling of said public transport shuttle.

5. The transport system as claimed in claim 3, in which the traveler movements management device (58) is further configured so that preselected public transport shuttles stop at certain stations, to predetermined timetables and for predetermined journeys, so as to pick up the passengers who so wish it, and set down those who wish to leave, according to a scheduled transport.

6. The transport system as claimed in claim 1, in which the access control device (60) comprises additional means for dynamic control of the vehicle entering via one of the entry lanes, which means are configured to:

determine at least one characteristic indicative of the dynamic behavior of an entering vehicle, chosen from the quality of the courses followed, the speed with respect to a setpoint speed, the acceleration and deceleration capabilities of the entering vehicle;

compare said controlled characteristic indicative of the dynamic behavior of the entering vehicle against a guideline; and allow or refuse the automotive vehicle access according to said comparison.

7. The transport system as claimed in claim 1, in which the platform (30) of at least one of the stations (29) for the public transport shuttles comprises platform doors (32), presence detectors (41) able to detect the presence of a public transport shuttle in front of each of the platform doors (32) and means (42) for controlling the platform doors which are able to trigger the opening of one of the platform doors (32) in response to detection of a transport shuttle in front of said platform door (32).

8. The transport system as claimed in claim 1, in which entry zones (6), exit zones (7) and/or stations for the public transport shuttles (8, 29) comprise parking zones equipped with a recharging device or with a battery exchange device.

9. The transport system as claimed in claim 1, in which the high-speed-traffic, service, entry and exit lanes comprise washed-concrete or fiber-reinforced concrete running surfaces.

10. The transport system as claimed in claim 1, in which the high-speed-traffic, service, entry and exit lanes comprise running surfaces which are separated by a space that allows runoff water and other dirt to be removed.

11. The transport system as claimed in claim 1, comprising a tunnel having an inside diameter of the order of 7.5 m, through which a first set of two lanes for one of the directions and a second set of two lanes for the other of the directions passes, said second set being arranged above or below the first set; each of the first and second sets of two lanes comprising two high-speed-traffic lanes or one high-speed-traffic lane and one service lane.

12. The transport system as claimed in claim 1, comprising a tunnel having an inside diameter of the order of 9.5 m, through which a first set of three lanes for one of the directions and a second set of three lanes for the other of the directions passes, said second set being arranged above or below the first set; each of the first and second sets of three lanes comprising three high-speed-traffic lanes or two high-speed-traffic lanes and one service lane.

13. The transport system as claimed in claim 12, in which the uprights (37) act as guides and in which the onboard sensors (47, 48, 49, 50, 51, 52) are ultrasonic radars positioned at the front, at the rear, and on the sides of the vehicles and able to detect said uprights (37).

14. The transport system as claimed in claim 1, in which the vehicles are each equipped with a control device which comprises a lane-change module for changing lanes between an original lane and a target lane, said lane-change module being connected to said onboard sensors (47, 48, 49, 50, 51, 52) and being configured to:
- detect a lane-change indicator, consisting of a discontinuity in the upright (37) separating the original lane from the target lane or of an optical indicator; or
- processing information indicative of a lane change and delivered by the traffic management device or stored in a memory of the vehicle;
- detect the position of one or more of the uprights of the target lane; and
- control said vehicle in such a way that it shifts away from the original lane toward the target lane according to the lane-change indicator or the information indicative of a lane change and the position of one of the uprights of the target lane.

15. The transport system as claimed in claim 1, characterized in that at least one of the vehicles comprises at least four wheels each one equipped with an in-built motor and each one able to rotate in order to steer the vehicle.

16. The transport system as claimed in claim 1, in which at least one of the lanes is equipped with an induction charging device able to deliver a magnetic field and in which at least one of the automotive vehicles or one of the public transport shuttles is equipped with a receiver able to convert the magnetic field into an electrical current so as to recharge a battery.

17. The transport system as claimed in claim 1, comprising stations (30) built at ground level, requiring no stairs in order to be used by the travelers and comprising service lanes (33) in the form of access ramps (34) to link the high-speed-traffic lanes.

18. The transport system as claimed in claim 1, comprising only vehicles equipped with a data memory storage system able to store the information needed for operation of said vehicles in said lanes, said vehicles being designed to run autonomously as far as the next exit lane or as far as the next station using said information stored in memory in the memory storage system.

19. The transport system as claimed in claim 1, comprising a recognition system in front of the platform doors in order to detect whether the traveler is indeed one who made a reservation.

20. The transport system as claimed claim 1, comprising public transport shuttles equipped with a recognition system in order to detect when the traveler who made a reservation is present in the shuttle and when he has left.

21. The transport system as claimed in claim 1, wherein the high-speed traffic lanes (2, 3, 4, 5, 25, 26, 27, 28) and said service lanes (9, 11, 10, 12, 13, 14, 15, 16) are bounded on each side by uprights (37); said high-speed traffic and service lanes having no upright (37) between the lanes at each place dedicated to a lane change.

* * * * *